(12) United States Patent
Yamamura

(10) Patent No.: US 7,349,041 B2
(45) Date of Patent: Mar. 25, 2008

(54) LIQUID CRYSTAL DISPLAY WITH LIGHT GUIDING PLATE REMOVED FROM LCD PANEL AND POLARIZING PLATE INSIDE LCD PANEL

(75) Inventor: Nobuyuki Yamamura, Seoul (KR)

(73) Assignee: Samsung Electronics Co., Ltd. (KR)

( * ) Notice: Subject to any disclaimer, the term of this patent is extended or adjusted under 35 U.S.C. 154(b) by 26 days.

(21) Appl. No.: 10/132,598

(22) Filed: Apr. 25, 2002

(65) Prior Publication Data

US 2003/0067565 A1 Apr. 10, 2003

(30) Foreign Application Priority Data

Oct. 5, 2001 (KR) ............... 2001-61517

(51) Int. Cl.
G02F 1/1335 (2006.01)
G02F 1/1343 (2006.01)
(52) U.S. Cl. ............... 349/61; 349/96; 349/117; 349/139
(58) Field of Classification Search .......... 349/96, 349/113, 61–65, 139, 117
See application file for complete search history.

(56) References Cited

U.S. PATENT DOCUMENTS

| | | | |
|---|---|---|---|
| 4,011,001 A * | 3/1977 | Moriya | 349/65 |
| 5,394,308 A | 2/1995 | Watanabe et al. | 362/31 |
| 5,477,422 A * | 12/1995 | Hooker et al. | 362/29 |
| 5,714,770 A * | 2/1998 | Kim | 257/59 |
| 5,886,759 A * | 3/1999 | Mashino et al. | 349/65 |
| 6,016,177 A * | 1/2000 | Motomura et al. | 349/98 |

(Continued)

FOREIGN PATENT DOCUMENTS

JP 8-240720 9/1996

(Continued)

OTHER PUBLICATIONS (Merriam Webster's Collegiate Dictionary 10TH Ed. at p. 14)(defining "adjacent")(Copyright 1999).*

(Continued)

Primary Examiner—Dung T. Nguyen
(74) Attorney, Agent, or Firm—Cantor Colburn LLP

(57) ABSTRACT

Disclosed is an ultra slimmed LCD capable of being applied to a hand-held terminal such as a cellular phone. In the LCD, a first substrate includes a pixel electrode. A switching element is formed on an inner surface of the first substrate, and turns on or off the pixel electrode. A first polarizing plate is attached on an outer surface of the first substrate. A second substrate faces the first substrate, and includes a color filter layer for displaying a color image. A common electrode is formed on the color filter layer. The second substrate converts a linear light input through one side face of the second substrate into a planar light. A liquid crystal layer is interposed between the first substrate and the second substrate. A second polarizing plate is arranged between the liquid crystal layer and the second substrate, and converts the planar light converted through the second substrate into a light vibrating in a predetermined direction. The second polarizing plate includes a polyvinyl alcohol layer of polymer polarization medium arranged at a middle layer, and two supporter layers of triacetyl cellulose arranged at upper and lower outer faces of the polyvinyl alcohol layer, respectively.

37 Claims, 8 Drawing Sheets

U.S. PATENT DOCUMENTS

| | | | |
|---|---|---|---|
| 6,052,170 A * | 4/2000 | Kobayashi | 349/149 |
| 6,229,585 B1 | 5/2001 | Yanagi | 349/65 |
| 6,501,520 B2 * | 12/2002 | Nose et al. | 349/96 |
| 6,512,562 B1 * | 1/2003 | Kobayashi et al. | 349/122 |
| 6,567,151 B1 * | 5/2003 | Song | 349/187 |
| 6,900,864 B2 * | 5/2005 | Iino | 349/115 |
| 2002/0163606 A1 * | 11/2002 | Kitai et al. | 349/98 |
| 2002/0163616 A1 * | 11/2002 | Jones et al. | 349/187 |

FOREIGN PATENT DOCUMENTS

| KR | 102000051500 | 8/2000 |
|---|---|---|
| KR | 120010030533 | 4/2001 |
| KR | 1020010055671 | 7/2001 |

OTHER PUBLICATIONS

An Office Action of the Patent Office of the People's Republic of China, Regarding corresponding patent application: 02107384.8; Date :Nov. 28, 2005.

* cited by examiner

LIQUID CRYSTAL DISPLAY WITH LIGHT GUIDING PLATE REMOVED FROM LCD PANEL AND POLARIZING PLATE INSIDE LCD PANEL

BACKGROUND OF THE INVENTION

1. Field of the Invention

The present invention relates to a liquid crystal display (LCD), and more particularly, to an LCD in which a light guiding plate is removed from an LCD panel and a polarizing plate is placed in the LCD panel.

2. Description of the Related Art

Generally, LCDs are widely being used as portable information terminal because of their slimmer in thickness and lighter in weight characteristics. An LCD panel is a passive device that does not emit light by itself, and is provided with a reflection plate at a rear side thereof. As such a LCD panel, there are a reflection type LCD panel that uses an external light as a light source, a projection type LCD panel, and a semi-projection type LCD panel. Each of the projection type LCD panel and the semi-projection type LCD panel has a back light assembly at a rear side thereof.

Since the LCD panel can be driven at a very low voltage, for instance, a few volts, the reflection type LCD has a low power consumption characteristic, but it cannot be used in a dark environment. Also, since a color LCD panel using a color filter has a very low efficiency of light, there is a drawback in that the reflective type LCD cannot display bright colors.

Regardless of the used light source types, for instance, natural light source or artificial light source, the light vibrating along only one direction is used. To this end, a polarizing plate is attached to both outer surfaces of the LCD panel.

Light is a kind of electromagnetic wave, vibrates in a sine function, and has a vibration direction normal to an advancing direction thereof. This vibration direction exists at the same probability in any direction without any directionality. The polarizing plate passes only the light vibrating along a selected one direction, and absorbs or reflects the remaining light vibrating along unselected directions using a proper medium. Resultantly, the polarizing plate functions to make a light vibrating along a specific direction.

In order to enhance the light efficiency, the polarizing plate is attached to both outer surfaces of the LCD panel. As these polarizing plates, there are a urea-based polarizing plate and a dye-based polarizing plate.

The urea-based polarizing plate is prepared by allowing polyvinyl alcohol to adsorb an urea-based solution having a high anisotropy, and drawing the resultant polyvinyl alcohol along a specific direction. The urea-based film has advantages such as a superior polarization property, and a high contrast ratio, but it may cause a problem due to a high sublimation of iodine molecules under an environment having a high temperature and a high humidity.

The dye-based polarizing plate is made by a similar method to the manufacturing method of the urea-based polarizing plate, i.e., by allowing polyvinyl alcohol as a polarization medium to adsorb a dye having a dichroism, and drawing the resultant polyvinyl alcohol such that chloride molecules are arranged along the drawing direction. As kinds of dye used, there are a direct dye and an acid dye. This dye-based polarizing plate, however, has a low polarity because of a low anisotropy of the dye itself compared with the urea-based polarizing plate, but it has a strong resistance against an environment having a high temperature and a high humidity.

FIG. 1 is a schematic view showing a conventional LCD in which a polarizing plate is used. Referring to FIG. 1, polarizing plates 40 and 50 are respectively attached to outer surfaces of upper glass substrate and lower glass substrate 10 and 20. A backlight assembly 90 is arranged near a side surface of a light guiding plate disposed below the lower glass substrate 20. A liquid crystal layer 30 is interposed between the upper glass substrate 10 and the lower glass substrate 20.

In FIG. 1, a reference numeral 32 denotes a sealant, a reference numeral 80 denotes an LCD panel.

FIG. 2 is a sectional view showing a constitution of the polarizing plate used in the LCD of FIG. 1. Referring to FIG. 2, a polymer polarization medium of polyvinyl alcohol layer 43 is centered at the polarizing plate, and supporter layers 42 and 44 of triacetyl cellulose (TAC) are attached on both surfaces of the polyvinyl alcohol layer 43. An upper protection film 41 is attached on the upper supporter layer 42, and an adhesive layer 45 and a lower protection film 46 in the order named are attached on the lower supporter layer 44.

Here, the supporter layers 42 and 44 are used for securing durability, mechanical strength, heat resistant property, humidity resistant property, etc., and the adhesive layer 45 is used for adhering the polarizing plates 40 and 50 to the glass substrates 10 and 20.

Among the aforementioned elements, the light guiding plate and the polarizing plate are important factors determining the whole thickness of the LCD panel.

Therefore, it is necessary to decrease the total thickness of the LCD panel by decreasing the thickness of the light guiding plate and the polarizing plate.

SUMMARY OF THE INVENTION

Accordingly, the present invention is to meet the aforementioned requirements, and it is an object of the present invention to provide an LCD capable of decreasing the whole thickness of an LCD by removing the light guiding plate from the LCD and arranging the polarizing plate inside the LCD panel.

To achieve the first object of the invention, there is provided a liquid crystal display (LCD) including an LCD panel. In the above LCD, the LCD panel includes a pair of transparent substrates, and a liquid crystal layer interposed therebetween. The LCD panel changes an alignment of liquid crystal molecules of the liquid crystal layer by a voltage applied to electrodes formed on inner surfaces of the substrates facing with each other and thereby displays an image. An illumination unit supplies a light to the LCD panel. Any one of the pair of substrates further has a light guiding plate function for converting a linear light output from a light source into a planar light.

According to another aspect of the invention, there is provided a liquid crystal display comprising an LCD panel. In the above LCD, the LCD panel includes a pair of transparent substrates, and a liquid crystal layer interposed therebetween. The LCD panel changes an alignment of liquid crystal molecules of the liquid crystal layer by a voltage applied to electrodes formed on inner surfaces of the substrates facing with each other and thereby displays an image. An illumination unit supplies a light to the LCD panel. At least one of the pair of substrates has a light guiding plate function for converting a linear light output from a light source into a planar light, and a first polarizing plate is interposed between the substrate having the light guiding plate function and the liquid crystal layer.

According to still another aspect of the invention, there is provided a liquid crystal display. In the above LCD, a first substrate includes a pixel electrode. A switching element is formed on an inner surface of the first substrate, and turns on or off the pixel electrode. A first polarizing plate is attached on an outer surface of the first substrate. A second substrate faces the first substrate, and includes a color filter layer for displaying a color image. A common electrode is formed on the color filter layer. The second substrate converts a linear light input through one side face of the second substrate into a planar light. A liquid crystal layer is interposed between the first substrate and the second substrate. A second polarizing plate is arranged between the liquid crystal layer and the second substrate, and converts the planar light converted through the second substrate into a light vibrating along a specific direction. The second polarizing plate includes a polyvinyl alcohol layer of polymer polarization medium arranged at a middle layer, and two supporter layers of triacetyl cellulose arranged at both outer faces of the polyvinyl alcohol layer.

BRIEF DESCRIPTION OF THE DRAWINGS

The above and other advantages of the present invention will become more apparent by describing in detail exemplary embodiments thereof with reference to the attached drawings in which.

DETAILED DESCRIPTION OF THE PREFERRED EMBODIMENTS

Now, preferred embodiments of the present invention will be described in detail with reference to the annexed drawings.

Figure 3:
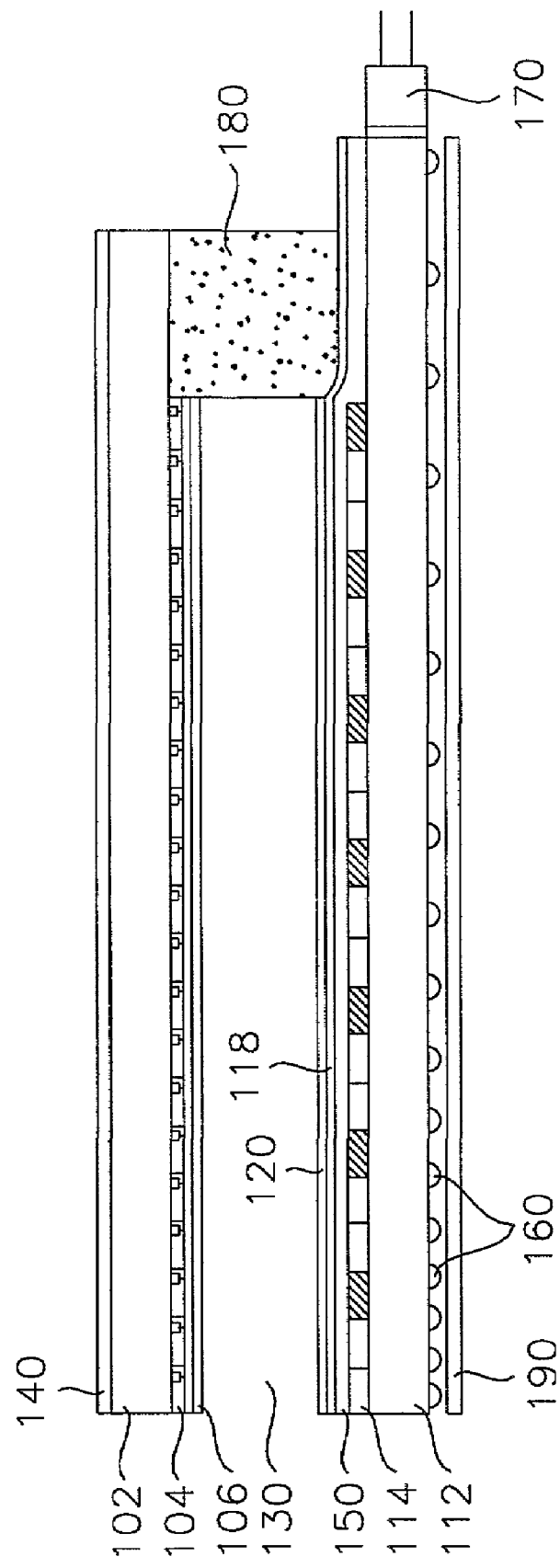
FIG. 3 is a simplified sectional view of an LCD in accordance with one embodiment of the present invention.

FIG. 3 is a simplified sectional view of an LCD in accordance with one embodiment of the present invention.

Referring to FIG. 3, an upper substrate (or first substrate) having a polarizing plate (or first polarizing plate) 140 attached at an outer surface thereof is arranged at a visible side (a viewer's side) of an LCD. The first substrate includes a first transparent substrate 102. On an inner surface of the first transparent substrate 102, there are formed pixel electrodes 104, and switching elements for switching the pixel electrodes 104. An upper orientation film (or first orientation film) 106 is formed below the pixel electrode 104 and the switching element.

A lower substrate (or second substrate) is arranged facing the first substrate. The lower substrate includes a second transparent substrate 112 for converting a linear light source into a planar light source. On an inner surface of the second transparent substrate 112, there are formed a color filter layer 114, a lower polarizing plate (or second polarizing plate) 150 for transmitting light beams vibrating only in a specific direction, a common electrode 118 for generating an electric field together with the pixel electrode 104 formed on the first transparent substrate 102, and a lower orientation film (or second orientation film) 120 for determining a pretilt angle of liquid crystal molecules of a liquid crystal layer 130 together with the first orientation film 106 formed on the inner surface of the first transparent substrate 102.

A light source 170 is arranged near one side surface and provide a linear light into the second transparent substrate 112. Although all kinds of light sources emitting light beams, for example, fluorescent plate, light emitting diode (LED), organic electroluminescent (EL), small sized incandescent lamp, etc may be used as the light source 170, LED, organic El, small sized incandescent lamp, etc., that do not need a special instrument such as inverter circuit, etc., and are driven at a low voltage are fit for a low power consumption. Preferably, the light emitting diode (LED) capable of decreasing the size of the size of the LCD itself is used.

In order to convert the linear light that is incident from the LED 170 into a planar light, a plurality of reflective dots 160 are formed on an outer surface of the second transparent substrate 112. Below the second transparent substrate 112, there is disposed a reflection plate 190 for reflecting a light leaked through the second transparent substrate 112 toward the first substrate side.

As the aforementioned first and second transparent substrates 102 and 112, inorganic transparent material such as glass, polymer of sheet type or film type, or a composite thereof can be used.

The reflective dots 160 that allow the second transparent substrate 112 to have a function as the light guiding plate are formed by any one method out of injection molding of glass material, etching of thermosetting plastic or photo-setting plastic, and attachment or establishment of a dot type film or plastic layer on a transparent plastic susbstrate or a glass substrate, and the like. In addition to a basic functions for supporting the liquid crystal layer, the substrate 112 having the reflective dots has the function of the light guiding plate for guiding and irradiating the light of the light source with a high efficiency.

Thus, since the second transparent substrate 112 in the LCD also has the function of the light guiding plate, the whole thickness of the LCD decreases by a value corresponding to the thickness of the light guiding plate of the conventional LCD. Further, since the second polarizing plate 150 is placed between the liquid crystal layer 130 and the second transparent substrate 112, i.e., at the inside of the LCD panel, the thickness of the TAC films 42 and 44 shown in FIG. 2 can be decreased in comparison with the conventional case that the polarizing plate is attached on the outer surface of the LCD panel. Resultantly, the whole thickness of the LCD panel may be decreased.

Figure 1:
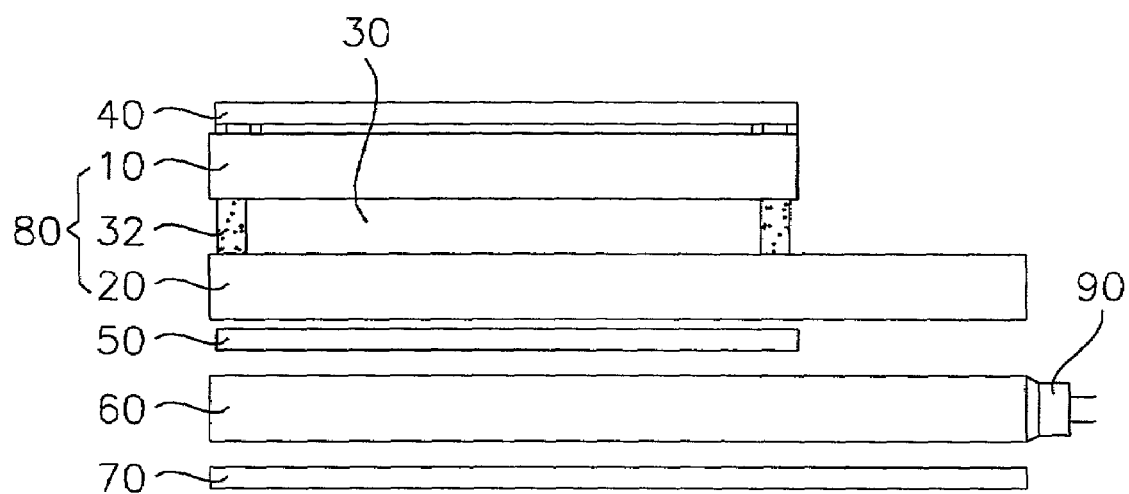
FIG. 1 is a simplified sectional view of an LCD in accordance with the conventional art.
Figure 2:
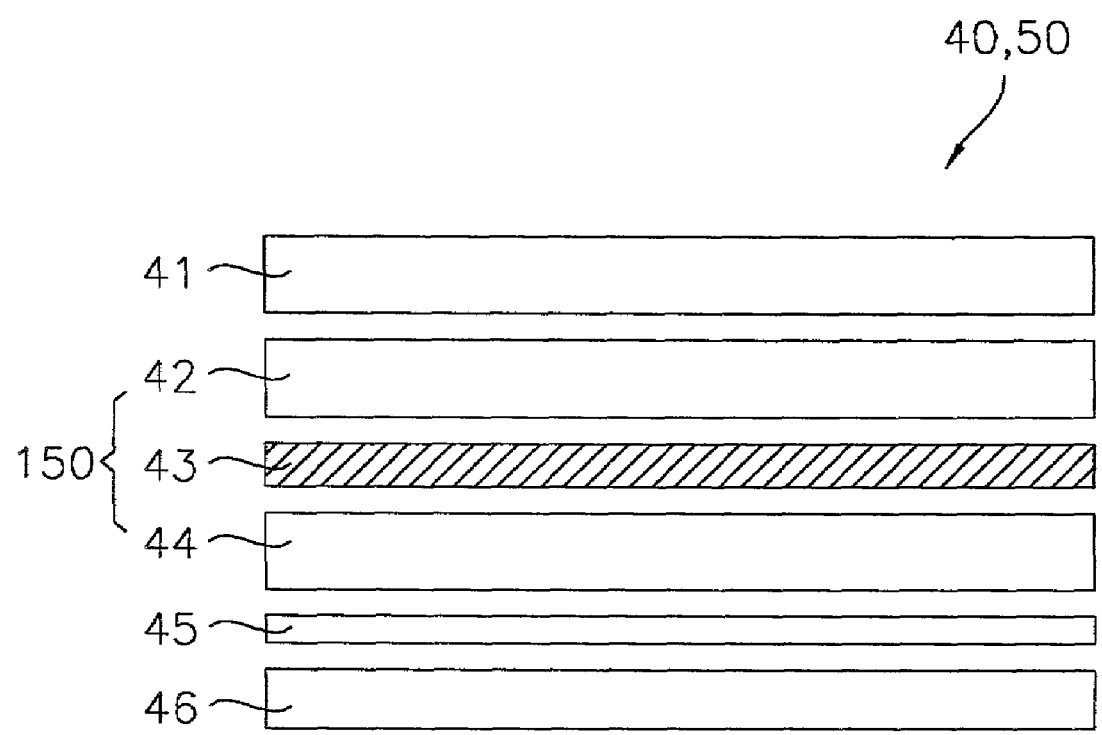
FIG. 2 is a sectional view of the polarizing plate of FIG. 1.

Moreover, since the second polarizing plate 150 can be formed by a coating method without being attached on the second transparent substrate 112, the use of the adhesive layer for attaching the polarizing plate on the glass substrate is excluded unlike that of FIG. 2. Accordingly, it is possible to decrease the whole thickness of the LCD panel by the thickness of the adhesive layer.

Figure 4:
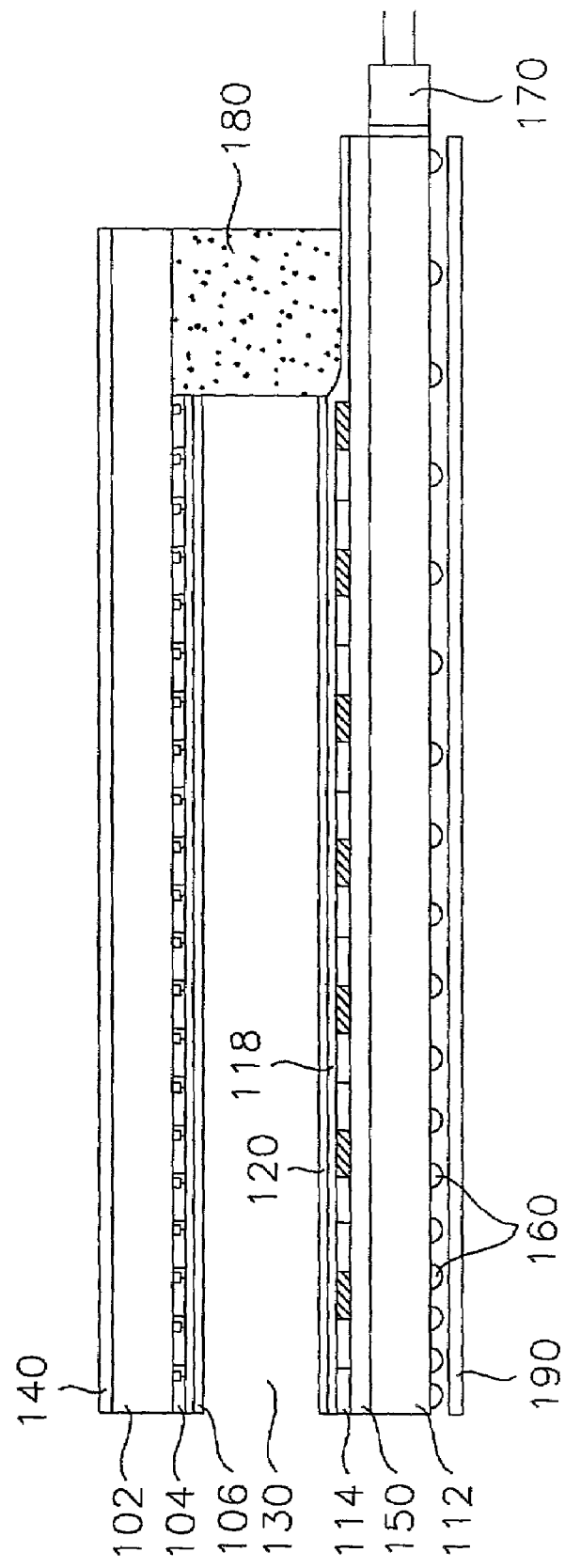
FIG. 4 is a simplified sectional view of an LCD in accordance with another preferred embodiment of the present invention.

FIG. 4 is a simplified sectional view of an LCD panel according to another preferred embodiment.

Compared with the LCD of FIG. 3, the LCD of FIG. 4 differs from that of FIG. 3 in the arrangement of the polarizing plate. Particularly, the second polarizing plate 150 is disposed between the color filter layer 114 and the transparent common electrode 118.

Upon comparing the LCD shown in FIG. 4 with the conventional LCD, the whole thickness of the LCD of FIG. 4 decreases by a value corresponding to the thickness of the light guiding plate of the conventional LCD. Further, the second polarizing plate is placed between the color filter layer 114 and the transparent common electrode layer 118, i.e., at the inside of the LCD panel, the thickness of the TAC films 42 and 44 shown in FIG. 2 can be decreased in comparison with the conventional case that the polarizing plate is attached on the outer surface of the LCD panel. Resultantly, the whole thickness of the LCD panel may decrease.

Furthermore, since it is possible to form the second polarizing plate 150 not by the attachment method of the second polarizing plate to the second transparent substrate 112 but by a coating method, a use of the adhesive layer 45 disclosed in FIG. 2 is excluded, so that the whole thickness of the LCD may decrease by the thickness of the adhesive layer 45.

Figure 5:
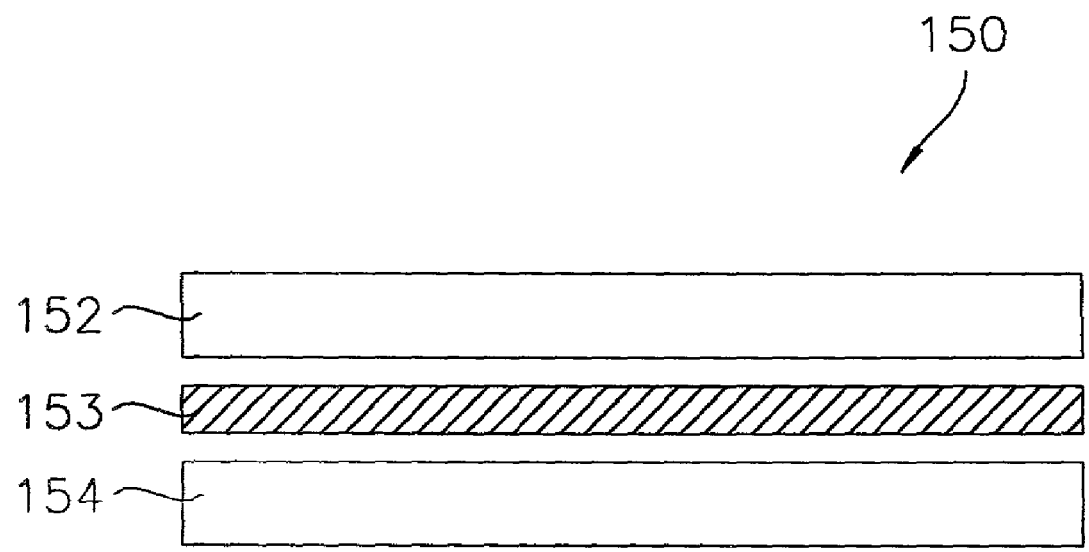
FIG. 5 is a simplified sectional view of a lower polarizing plate applied to the embodiments of the present invention.

FIG. 5 is a sectional view showing a constitution of the second polarizing plate 150 used the first and second embodiments of the present invention.

When comparing the second polarizing plate of FIG. 5 with that of FIG. 2, it is well known that the second polarizing plate of FIG. 5 does not have the adhesive layer 45.

Prior to mentioning a particular specification of the second polarizing plate applied to the present invention, the constitution of the conventional upper and lower polarizing plates is reviewed with reference to the accompanying FIG. 2.

Referring to FIG. 2, the polyvinyl alcohol layer 43 of polymer polarization medium has a thickness of approximately 30±5.0μm, each of the supporter layers positioned at both outer surfaces has a thickness of approximately 80±5.0μm, the upper protection film 41 has a thickness of approximately 63±5.0μm, the adhesive layer 43 has a thickness of approximately 25±5.0μm, and the lower protection film 46 has a thickness of approximately 38±5.0μm.

Here, the upper protection film 41 and the lower protection film 46 are attached to protect the polyvinyl alcohol layer 43 from foreign articles, and since they are removed during the attachment process of the polarizing plate, the actual thickness of the polarizing plate corresponds to a thickness of summing up the thickness of the polyvinyl alcohol layer 43, the thickness of the two supporter layers 42 and 44, and the thickness of the adhesive layer 45. The total thickness approaches approximately 215μm.

Accordingly, as one example, if the second polarizing plate 150 of FIG. 5 is formed by a coating method as mentioned previously, the second polarizing plate 150 comes to have a constitution in which the thickness of the polyvinyl alcohol layer 143 of the polymer polarization medium is maintained identically with the thickness of the polyvinyl alcohol layer 43 of FIG. 2, the thickness of the upper and lower supporter layers 152 and 154 decreases by approximately 50μm compared with the thickness of the conventional both supporter layers, resulting in approximately 30±5.0μm, and the adhesive layer 45 of FIG. 2 is removed.

As a result, the thickness of the second polarizing plate becomes approximately 130±5.0 μm which decreases by approximately 85 μm compared with the thickness of the conventional second polarizing plate, 215 μm.

By decreasing the thickness of each of the supporter layers like the above, a slimmed LCD in which the thickness of the second polarizing plate is no more than 130μm can be provided.

Also, as a second example, there is the second polarizing plate in which the lower supporter layer 154 is removed from the constitution of FIG. 5. At this time, the thickness of the upper supporter layer 152 and the thickness of the polyvinyl alcohol layer 153 are the same as those of the conventional second polarizing plate.

Resultantly, by applying the second example to an LCD, it is possible to provide a slimmed LCD panel in which the thickness of the second polarizing plate 150 is no more than 110 μm.

As a third example, there is provided the second polarizing plate in which the lower supporter layer 154 is removed from the constitution of FIG. 5. At this time, the thickness of the polyvinyl alcohol layer 153 is the same as that of the conventional second polarizing plate, and the thickness of the upper supporter layer 152 is approximately 30±5.0.μm which is thinner than the thickness of the conventional upper supporter layer by a thickness of 85μm.

Resultantly, by applying the third example to an LCD, it becomes possible to provide a slimmed LCD panel in which the thickness of the second polarizing plate 150 is no more than 60 μm.

As provided in the above three examples, one can make a slimmed LCD by decreasing the thickness of the second polarizing plate 150 and further allow the second substrate 112 to have the function of the light guiding plate.

Meanwhile, visible angle dependence in the LCD panel occurs because the birefringence effect of light that is incident with an inclination about the LCD panel differs from that of light that is incident normal to the LCD panel. To this end, an optical device in which the birefringence effect is varied with an incident angle of the light to compensate for a difference in the birefringence depending on the viewing position by overlapping the optical device on the LCD panel is necessary. For the above optical device, a phase difference film is used.

The phase difference film is used in a state in which it is coupled to the polarizing plate. For an instance between the lower supporter layer 44 of the polarizing plate and the adhesive layer 45 shown in FIG. 2, a compensation film made of discotic liquid crystal having a thickness of approximately 2μm is interposed. In order to support and attach the compensation film, there are sequentially arranged an adhesive layer (second adhesive layer) having a thickness of approximately 25±5.0μm and a supporter layer (second supporter layer) having a thickness of approximately 100±10μm.

However, when a reliability test is carried out by applying the above constituted polarizing plate as the first polarizing plate to an LCD, the light leakage failure at an edge portion, which is not generated in a general polarizing plate having no the phase difference film is seriously generated. This is understood that when the second adhesive layer added for the manufacturing of the phase difference film is deformed by heat concentrated on the edge portion of the LCD panel at a high temperature, the second supporter layer below the second adhesive layer and the compensation film are twisted and contracted, so that such a failure is generated.

Figure 6:
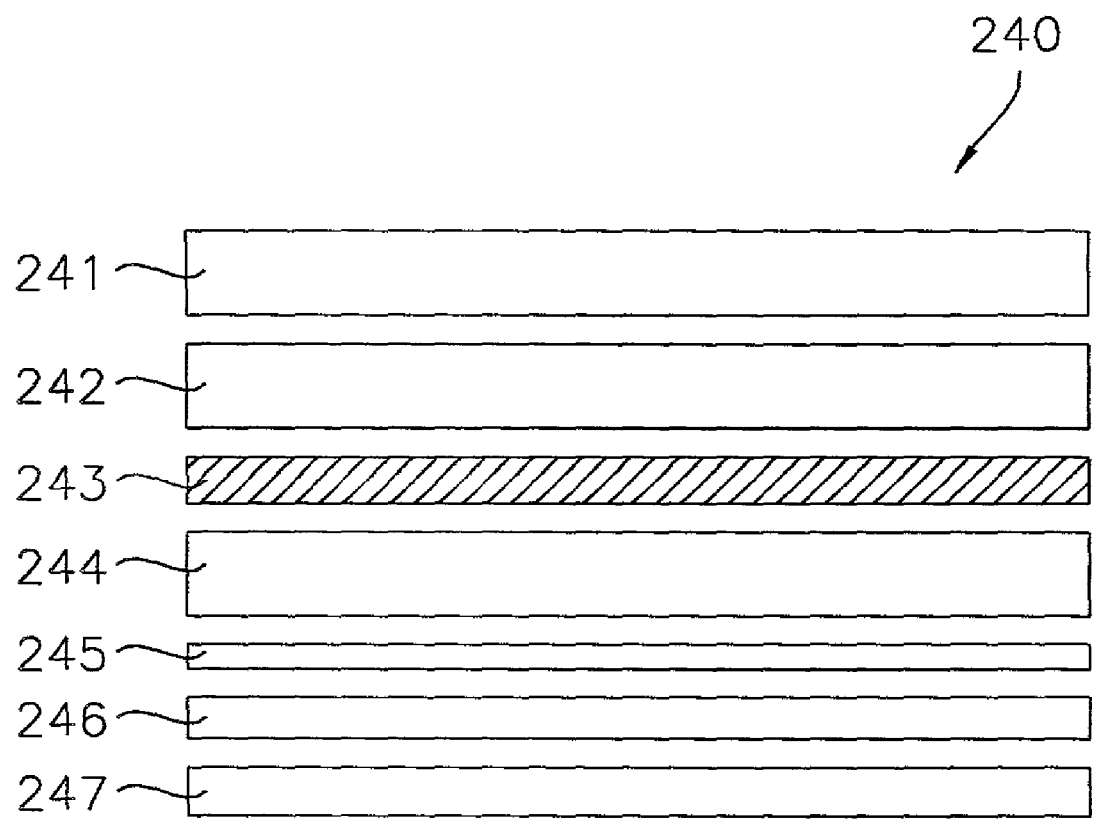
FIG. 6 is a simplified sectional view of an upper polarizing plate applied to the embodiments of the present invention.

FIG. 6 is a sectional view showing a constitution of an optical compensation polarizing plate for removal of light leakage.

Referring to FIG. 6, the optical compensation polarizing plate 240 has a structure in which a protection film (hereinafter referred to as "first protection film) 247 having a thickness of approximately 38±5.0 μm, an adhesive layer 246 having a thickness of approximately 25±5.0 μm, a compensation film 245 made of discotic liquid crystal and having a thickness of approximately 2 μm, a supporter layer (hereinafter referred to as "first supporter layer") 244 having a thickness of approximately 100±10 μm, a polarization device layer 243 having a thickness of approximately 30±5.0 μm, a supporter layer (hereinafter referred to as "second supporter layer") 242 having a thickness of approximately 60±5.0 μm, and a protective layer (hereinafter referred to as "second protective layer") 241 having a thickness of approximately 60±5.0 μm and in which a static electricity prevention treatment is carried out, are sequentially stacked.

Compared with the conventional constitution to which the phase compensation film is added, the optical compensation polarizing plate 240 of FIG. 6 has the constitution in which the lower supporter layer having a thickness of approximately 80±10μm and the adhesive layer having a thickness of approximately 25±5μm are removed from the conventional constitution, sot that the thickness of the polarizing plate decreases from 440±55μm, so one can make a slimmed LCD.

Figure 7:
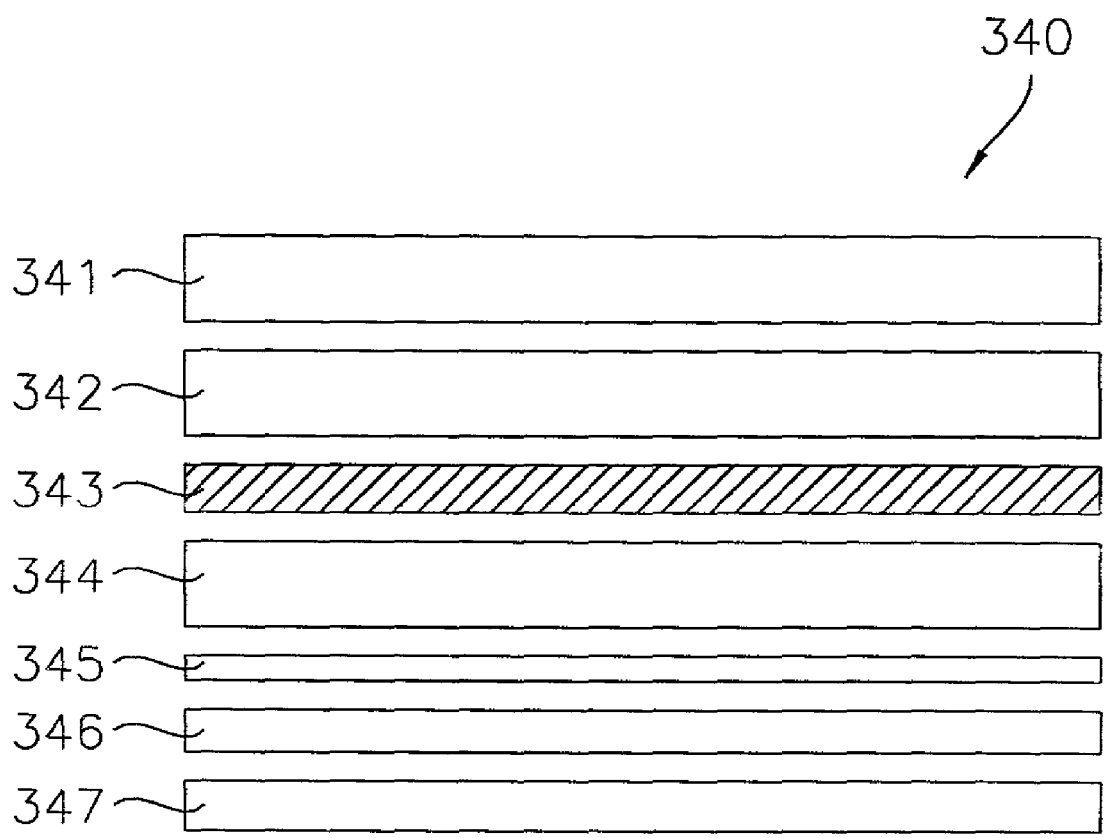
FIG. 7 is a simplified sectional view of an another upper polarizing plate applied to the embodiments of the present invention.

Also, as another embodiment, the second polarizing plate is formed at the inside of the LCD panel, and as shown in FIG. 7, the first polarizing plate 340 is made in a constitution in which the adhesive layer having a thickness of approximately 25±5μm, and the supporter layer having a thickness of approximately 100±10μm are removed from the constitution of the conventional phase difference film, and the compensation film made of discotic liquid crystal is merely interposed between the lower supporter layer 344 of the conventional polarizing plate and the adhesive layer 346, so that it is possible to provide an LCD having a slimmed optical compensation polarizing film without a twist failure or a contraction failure.

Thus, by using the aforementioned optical compensation polarizing plate as the upper polarizing plate, one can basically prevent the light leakage failure at the edge portion of the LCD panel, to realize the slimmed LCD, and to decrease the manufacturing cost of the polarizing plate.

Figure 8:
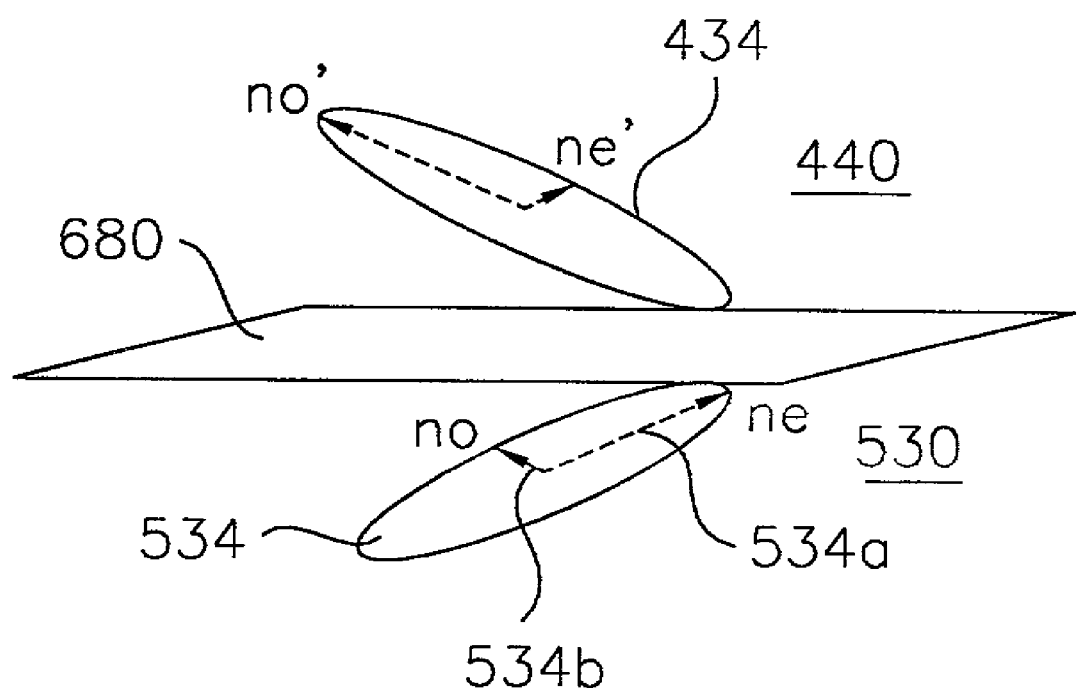
FIG. 8 is a schematic view for describing a driving mechanism of the upper polarizing plate shown in FIG. 7.

FIG. 8 is a schematic view for describing an optical compensation principle when the above constituted optical compensation plate is applied to an LCD. In FIG. 8, a reference numeral 130 indicates liquid crystal layer, reference numerals 240 and 340 indicate optical compensation polarizing plates and a reference numeral 180 indicates a boundary between the liquid crystal layer 130 and the optical compensation polarizing plates 240 and 340.

Liquid crystal 134 of the liquid crystal layer 130 has birefringence in which the refractivity of a short axis direction differs from that of a long axis direction. From this birefringence, the liquid crystal is classified into a positive liquid crystal in which an extra ordinary refractivity $n_n$ is greater than an ordinary refractivity $n_o$, i.e., $\Delta n = n_o \times n_o > 0$, and a negative liquid crystal in which the extra ordinary refractivity $n_o$ is smaller than the ordinary refractivity $N_o$, i.e., $\Delta n = n_o \times n_o < 0$.

Refractivity is an important factor to determine the light velocity passing through a medium optically, and to describe a progressive mechanism of the light in the medium. Accordingly, when it is viewed at the front of the LCD panel, the light is mainly influenced by the extra ordinary refractivity while when it is viewed with an inclination about the front of the LCD panel, the light is mainly influenced by the ordinary refractivity, so that there occurs a difference in the refractivity of the light, thereby there occurs a difference in the variation rate of the polarization status while the polarization status is varied from the linearly polarized status to the planar polarized status with passing through the liquid crystal layer, and thereby the light amount and color characteristic at the front of the LCD panel become different from those at positions other than the front of the LCD panel.

So, if considering an ideal concept to compensate for a phase difference generated in a liquid crystal layer 130, there are used optical compensation polarizing plates 240 and 340 of which the extra ordinary refractivity is identical to the ordinary refractivity of the crystal layer 130, and of which the ordinary refractivity is identical to the ordinary refractivity of the liquid crystal layer, i.e., $n_o = n_o'$, and $n_o = n_o'$.

To compensate for the phase difference using the optical compensation polarizing plates 240 and 340, retardation of the LC cell, i.e., $\alpha n (=n_o-n_o) \cdot d$ (thickness of the LC cell), and retardation of the phase difference film, i.e., $\alpha n (=n_o'-n_o') \cdot d'$ (thickness of the phase difference film), should be identical to each other, and thus the thickness of the LC cell, d becomes identical to the thickness of the phase difference film, d'.

Thus, since a phase variation in the LC cell, $\alpha n \cdot d$, has the same value than that in the phase difference film, $\alpha n' \cdot d'$, but has an opposite direction, they compensate for phase difference each other. However, in case of real twisted nematic LC cell, since a degree in which liquid crystals aligned in parallel with a surface of a glass substrate is vertically aligned is varied with a gray level, the phase difference film has a three dimensional refractivity, and the refractivity is varied with the wavelength of the light, it is an improper thought to regard as their relationship as $n_{o=no}'$, and $n_{o=no}'$.

Accordingly, although the thickness of the phase difference film is defined within a specific range in FIGS. 6 and 7, it is not limited only to such a range. In other words, the thickness should be sent in an optimum range though a simulation considering αn, cell gap, light wavelength, etc.

As described above, the LCD of the present invention has no light guiding plate, but has a polarizing plate established at an inside of the LCD panel, and thereby rendering the polarizing plate more thinner, so that a slimmed LCD can be obtained.

Further, one can decrease an amount of raw material used in manufacture the light guiding plate and the polarizing plate, so that a manufacturing cost is saved.

While the present invention has been described in detail, it should be understood that various changes, substitutions and alterations could be made hereto without departing from the spirit and scope of the invention as defined by the appended claims.

What is claimed is:

1. A liquid crystal display (LCD) comprising:
   an LCD panel including first and second transparent substrates and a liquid crystal layer interposed therebetween, wherein the first transparent substrate is placed at a viewer's side of the liquid crystal display and the second transparent substrate is placed at an illumination side of the liquid crystal display, and the liquid crystal layer is enclosed by the first and second transparent substrates and a sealant, the second transparent substrate having a greater size than the first transparent substrate, wherein the second transparent substrate at the illumination side includes a color filter layer that displays a color image, and the first transparent substrate at the viewer's side includes a plurality of pixel electrodes and a plurality of switching elements to switch the pixel electrodes; and an illumination unit disposed adjacent to the second transparent substrate, the illumination unit supplying directly a linear light to the second transparent substrate, wherein the second transparent substrate converts the linear light from the illumination unit into a planar light, the second transparent substrate having a first surface at the viewer's side through which the planar light is outputted toward the liquid crystal layer, a second surface at the illumination sick opposite to the first surface, and light scattering dots formed directly on the second surface of the second transparent substrate.

2. The LCD of claim 1, further comprising a reflection plate placed at the second surface of the second transparent substrate, the reflection plate reflecting a light leaked through the second surface toward the first transparent substrate.

3. The LCD of claim 1, wherein the illumination means includes an LED.

4. The LCD of claim 1, wherein the second transparent substrate is a light guiding plate that converts the linear light into the planar light and provides the planar light to the liquid crystal layer.

5. The LCD of claim 1, wherein the second substrate comprises a color filter layer that displays a color image.

6. The LCD of claim 5, wherein the second substrate further comprises a common electrode formed on the color filter layer.

7. The LCD of claim 1, wherein the illumination unit is adjacent to a side surface of the second substrate.

8. The LCD of claim 1, wherein the illumination unit makes contact with the second transparent substrate.

9. The LCD of claim 1, wherein the linear light is directly incident into the second transparent substrate in substantially parallel wit a longitudinal direction of the second transparent substrate.

10. A liquid crystal display (LCD) comprising:
an LCD panel including:
a first transparent substrate placed at a viewer's side of the liquid crystal display, the first transparent substrate including a plurality of pixel electrodes and a plurality of switching elements to switch the pixel electrodes;
a second transparent substrate placed at an illumination side of the liquid crystal display, the second transparent substrate receiving a linear light and convening the linear light into a planar light to emit the planar light through a first surface of the second transparent substrate toward the first transparent substrate, the second transparent substrate having a greater size than the first transparent substrate, the second transparent substrate at the illumination side including a color filter layer that displays a color image; and
a liquid crystal layer interposed between the first and second transparent substrates;
an illumination unit that supplies directly the linear light to the second transparent substrate; and
a first polarizing plate disposed between the second transparent substrate and the liquid crystal layer, the first polarizing plate polarizing the planar light emitted from the second transparent substrate to provide a light vibrating in a first direction to the liquid crystal layer, wherein the second transparent substrate has a second surface at the illumination side opposite to the first surface, and light scattering dots formed directly on the second surface of the second transparent substrate, and the linear light from the illumination unit is incident into between the first and second surfaces.

11. The LCD of claim 10, wherein the first polarizing plate comprises a polymer polarization medium, and first and second supporter layers disposed on upper and lower outer faces of the polymer polarization medium layer, respectively.

12. The LCD of claim 11, wherein the polymer polarization medium includes polyvinyl alcohol, and the first and second supporter layers include triacetyl cellulose.

13. The LCD of claim 10, further comprising a reflection plate placed at the second surface of the second transparent substrate, the reflection plate reflecting a light leaked through the second surface toward the LCD panel, between the color filter layer and an inner surface of the second substrate.

14. The LCD of claim 10, further comprising a second polarizing plate disposed on the first transparent substrate, the second polarizing plate polarizing a light provided from the liquid crystal layer through the first transparent substrate.

15. The LCD of claim 14, wherein the second polarizing plate includes an adhesive layer directly attached on an outer surface of the first transparent substrate, and a third supporter layer, a polymer polarization medium layer, and a fourth supporter layer sequentially disposed on the adhesive layer.

16. The LCD of claim 14, wherein the second polarizing plate includes an adhesive layer directly attached on an outer surface of the first transparent substrate, and a phase compensation film, a third supporter layer, a polymer polarization medium layer, and a fourth supporter layer sequentially disposed on the adhesive layer.

17. The LCD of claim 10, wherein the second transparent substrate is a light guiding plate that converts the linear light into the planar light and provides the planar light to the liquid crystal layer.

18. The LCD of claim 10, wherein the second substrate comprises a color filter layer that displays a color image.

19. The LCD of claim 18, wherein the second substrate further comprises a common electrode formed on the color filter layer.

20. The LCD of claim 10, wherein the illumination unit is adjacent to a side surface of the second substrate.

21. The LCD of claim 10, wherein the illumination unit makes contact with the second transparent substrate.

22. The LCD of claim 10, wherein the linear light is directly incident into the second transparent substrate in substantially parallel with a longitudinal direction of the second transparent substrate.

23. A liquid crystal display (LCD) comprising:
a first substrate placed at a viewer's side of the liquid crystal display and including a pixel electrode and a switching element formed on an inner surface thereof, the switching element switching the pixel electrode;
a first polarizing plate attached on an outer surface of the first substrate, the first polarizing plate polarizing a light emitted from the first substrate;
a second substrate placed at an illumination side of the liquid crystal display and including a color filter layer that displays a color image, and a common electrode formed on the color filter layer, wherein the second substrate has a first surface at the viewer's side, a second surface at the illumination side opposite to the first surface, and a linear light provided from a light source is incident directly into between the first and second surfaces and second substrate converts the linear light into a planar light, the second substrate having a greater size than the first substrate;

a liquid crystal layer interposed between the first substrate and the second substrate; and a second polarizing plate arranged between the liquid crystal layer and the second substrate, the second polarizing plate polarizing the planar light emitted from the second substrate to provide a light vibrating in a predetermined direction to the liquid crystal layer, wherein the second polarizing plate comprises a polymer polarization medium layer, and first and second supporter layers arranged at upper and lower outer faces of the polymer polarization medium layer, and the second substrate includes light scattering dots formed directly on the second surface of the second substrate, the light scattering dots converting the linear light into the planar light.

24. The LCD of claim 23, wherein the polymer polarization medium includes polyvinyl alcohol, and the first and second supporter layers include triacetyl cellulose.

25. The LCD of claim 23, wherein the second polarizing plate is arranged between the color filter layer and the common electrode.

26. The LCD of claim 23, wherein the second polarizing plate is disposed between the color filter layer and an inner surface of second substrate.

27. The LCD of claim 26, wherein the second polarizing plate is directly coated on the first surface of the second substrate so that no adhesive layer exists between the second polarizing plate and the second substrate.

28. The LCD of claim 23, further comprising a reflection plate placed at the second surface of the second substrate, the reflection plate reflecting a light leaked from the second substrate toward the first substrate.

29. The LCD of claim 23, wherein the light source is disposed adjacent to the second substrate.

30. The LCD of claim 29, wherein the light source includes an LED.

31. The LCD of claim 23, wherein the first polarizing plate comprises an adhesive layer directly attached on an outer surface of the first substrate, and a first supporter layer, a polymer polarization medium layer, and a second supporter layer sequentially disposed on the adhesive layer.

32. The LCD of claim 23, wherein the first polarizing plate comprises an adhesive layer directly attached on an outer surface of the first substrate, and a phase compensation film, a first supporter layer, a polymer polarization medium layer, and a second supporter layer sequentially disposed on the adhesive layer.

33. The LCD of claim 23, further comprising:

a first orientation film disposed between the first substrate and the liquid crystal layer; and a second orientation film disposed between the liquid crystal layer and the second substrate, wherein the first and second orientation films determine a pretilt angle of liquid crystal molecules of the liquid crystal layer.

34. The LCD of claim 23, wherein the second substrate is a light guiding plate that converts the linear light into the planar light and provides the planar light to the liquid crystal layer.

35. The LCD of claim 23, further comprising an illumination unit that supplies the linear light to the second transparent substrate, and the illumination unit is adjacent to a side surface of the second substrate.

36. The LCD of claim 23, wherein the illumination unit makes contact with the second transparent substrate.

37. The LCD of claim 23, wherein the linear light is directly incident into the second transparent substrate in substantially parallel with a longitudinal direction of the second transparent substrate.

* * * * *